US012769937B2

(12) United States Patent
Sarin

(10) Patent No.: US 12,769,937 B2
(45) Date of Patent: Oct. 20, 2026

(54) DYNAMIC DEPLOYMENT OF SMALL LANGUAGE MODELS

(71) Applicant: PayPal, Inc., San Jose, CA (US)

(72) Inventor: Pankaj Sarin, Fremont, CA (US)

(73) Assignee: PayPal, Inc., San Jose, CA (US)

( * ) Notice: Subject to any disclaimer, the term of this patent is extended or adjusted under 35 U.S.C. 154(b) by 113 days.

(21) Appl. No.: 18/619,833

(22) Filed: Mar. 28, 2024

(65) Prior Publication Data

US 2025/0307538 A1 Oct. 2, 2025

(51) Int. Cl.
*G06F 40/20* (2020.01)

(52) U.S. Cl.
CPC .................................... *G06F 40/20* (2020.01)

(58) Field of Classification Search
CPC ...................................................... G06F 40/20
See application file for complete search history.

(56) References Cited

U.S. PATENT DOCUMENTS

| | | | | |
|---|---|---|---|---|
| 9,747,895 | B1 | 8/2017 | Jansche | |
| 2017/0199998 | A1 | 7/2017 | Bruno | |
| 2019/0259380 | A1 | 8/2019 | Biyani | |
| 2020/0364617 | A1* | 11/2020 | Luong | G06N 3/084 |
| 2021/0090278 | A1* | 3/2021 | Takama | G06T 7/55 |
| 2022/0301558 | A1* | 9/2022 | Carmeli | G10L 15/1822 |
| 2023/0353674 | A1* | 11/2023 | Karp | H04M 3/58 |
| 2025/0069617 | A1* | 2/2025 | Carbune | G10L 15/183 |

FOREIGN PATENT DOCUMENTS

| | | | |
|---|---|---|---|
| IN | 878/MUM/2005 | A | 6/2007 |
| KR | 10-2022-0158573 | A | 12/2022 |
| KR | 10-2601848 | B1 | 11/2023 |

OTHER PUBLICATIONS

International Search Report and Written Opinion—PCT/US2025/020084—ISA/EPO—May 16, 2025.

* cited by examiner

*Primary Examiner* — Sonia L Gay
(74) *Attorney, Agent, or Firm* — Haynes and Boone, LLP

(57) ABSTRACT

Methods and systems are presented for reducing computer power consumption and speeding system response times by dynamically generating and deploying one or more small language models (SLMs) to facilitate automated interactions with users. A context is derived for a chat session based on an utterance submitted by the user and other contextual information associated with the chat session. A SLM is generated specifically for the chat session based on the context. The SLM can be generated by extracting one or more portions of an internal structure of a large language model (LLM), or by merging two or more pre-generated SLMs. The SLM is deployed to generate content for the chat session. When it is detected that the context has changed, the SLM can be updated by incorporating additional parameters from the LLM to continue facilitating automated interactions with the user during the chat session.

20 Claims, 7 Drawing Sheets

DYNAMIC DEPLOYMENT OF SMALL LANGUAGE MODELS

BACKGROUND

The present specification generally relates to machine learning models, and more specifically, to providing a computer framework for dynamically deploying small language models according to various embodiments of the disclosure.

RELATED ART

Large language models (LLMs) have been used by organizations to facilitate automated dialogue-based interactions with users. Typical LLMs, such as GPT-4, BERT, LLaMA, etc., are powerful and flexible as they are capable of learning and generating content (e.g., responses to user-queries) in a natural language format across a wide range of subject matters (also referred to as "domains"). However, the internal structure of a typical LLM is highly complex. For example, it is common for an LLM to include over 500 billion parameters, which requires incorporation of a highly complex computer software structure into the LLM. Due to their highly complex internal structure, LLMs generally consume substantial computer processing power and requires significant time to generate, train, deploy, and/or utilize, which can greatly hinder the performance of systems that utilize LLMs, such as chat systems that provide automated interactions with users. As such, Applicant recognizes that there is a need for a more computational and power efficient solution in facilitating automated dialogue-based interactions with users.

Figure 1:
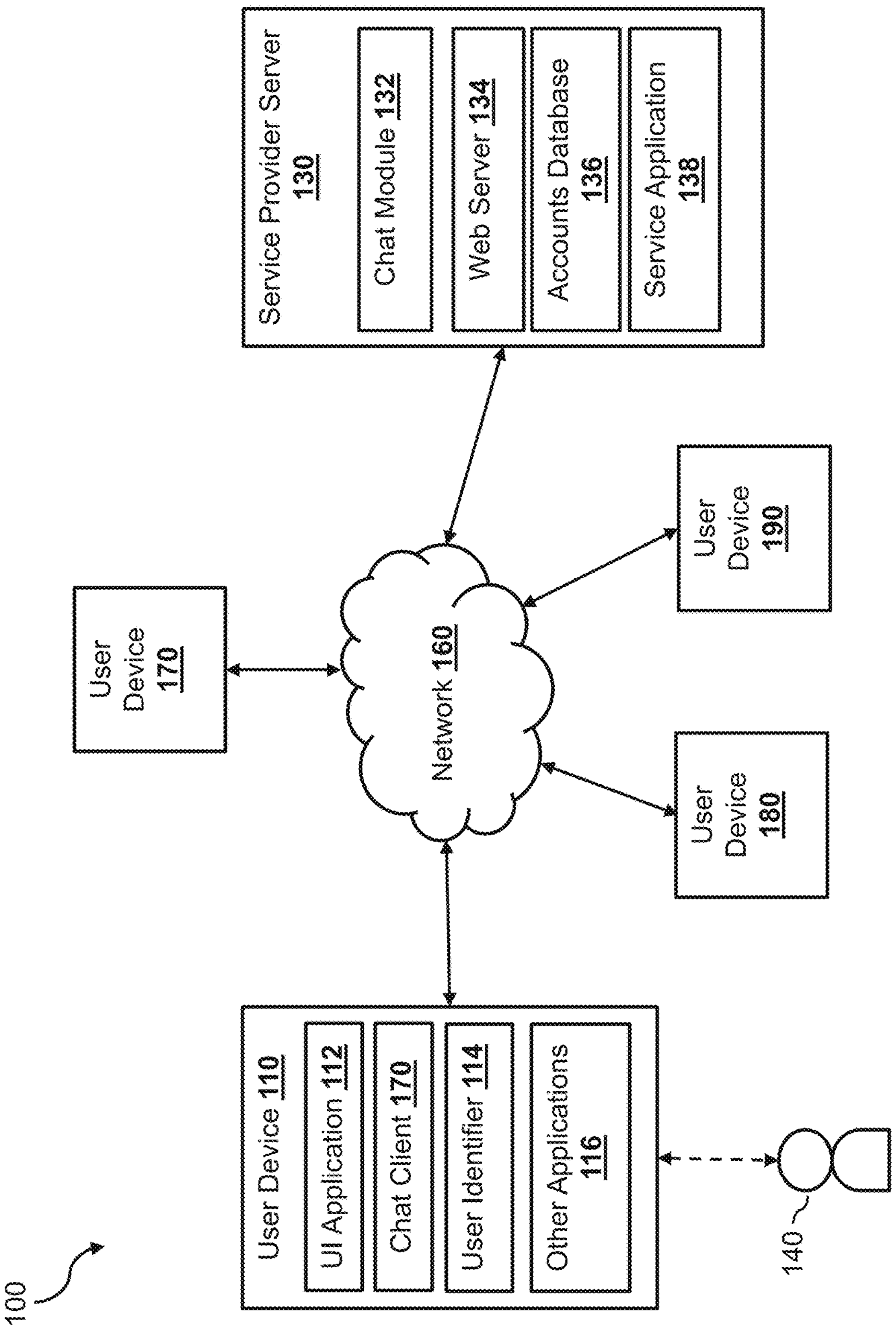
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes a computer framework for dynamically generating, deploying, and/or utilizing small language models (SLMs) for facilitating automated interactions with users according to various embodiments. As discussed above, large language models (LLMs) are usable to provide automated interactions with users. For example, an organization may deploy an LLM to be connected with or integrated within a chat system to conduct conversations. Such an LLM may be configured and trained to provide responses to user queries across a number of domains related to the organization. As such, a user may be able to submit a query associated with any one of the domains via a chat interface provided by the organization, and the LLM may be utilized by the chat system to generate automated responses for the user.

In order for the LLM to learn the subject matter and to provide intelligent responses across the different domains to the users, the internal structure of the LLM may be proportionally large and complicated. For example, a typical LLM may include over 500 billion parameters usable for learning, digesting, and generating content associated with the different domains. Each of the parameters associated with the LLM may be responsible for performing a specific task based on analyzing one or more input values. Some of the parameters may be associated with tasks that are usable across multiple domains, while some of the parameters may be associated with tasks that are specific for a respective domain. For example, one parameter may be associated with categorizing a customer's intent based on an utterance provided by a user (which is usable across different domains). Another parameter may be associated with generating instructions for disputing a transaction (which is usable only for a "dispute" domain).

The internal structure (or simply "structure) of a model includes computer software data structures (e.g., data variables, objects, etc.), and software logic that performs various computer processes associated with the data structures. For example, when a model is implemented as an artificial neural network, the internal structure may include computer nodes in various layers within the artificial neural network, the connections among the nodes, and the computer logic that processes data within each node.

Due to the complexity of the internal structures of LLMs, it typically requires a substantial amount of computer processing power and time to generate, deploy, and or utilize LLMs. For example, a LLM may take several seconds to generate a response to a user query. Such a long response time may be deemed unacceptable to many users and may drive the users away from the chat system as a result. Consequently, a user may terminate the chat session with the chat system due to the long response time, and may resort to directly contacting a human agent of the organization, which is an undesirable result for many organizations. Further, longer response times require the LLM to use more processing power as well as potentially delaying or increasing processing of other operations.

As such, according to various embodiments of the disclosure, a computer framework is provided for dynamically generating, deploying, and utilizing different SLMs for facilitating automated interactions with the users in order to improve the performance of a chat system. An SLM is a light-weight artificial intelligence model. Similar to an LLM, a SLM is also trained based on a large amount of data in order to facilitate useful automated dialogues with users. However, a SLM is typically much less complex than an LLM (e.g., has fewer parameters than an LLM). For example, while an LLM typically has over 500 billion parameters, a typical SLM may have approximately 1 million parameters. Such a reduction in scale enables the SLM to be much more nimble and efficient than an LLM. For example, it would require much less computer processing power and time to generate, train, deploy, and/or utilize a SLM than an LLM. While an LLM may take several seconds to generate a response for a user query, a SLM may take only several milliseconds to generate a response. The time and/or processing cycles to generate an LLM may also be several times the amount of time needed to generate and/or deploy a SLM.

In some embodiments, instead of, or in addition to, using an LLM, the chat system may utilize one or more SLMs for facilitating automated interactions with the users. The chat system may still utilize the LLM to perform certain functions, but may deploy one or more SLMs, instead of the single LLM, to conduct the interactions with the users. Due to the reduced complexity (e.g., the reduced number of parameters) of the internal structure of an SLM, the SLM may not be as powerful and flexible as an LLM. For example, an SLM may not be able to generate content (e.g., responses to user queries) associated with all of the domains related to the organization. As such, in some embodiments, the chat system may generate, train, deploy, and/or utilize different SLMs for facilitating dialogues with different users (or for different contexts associated with the users).

In some embodiments, when the chat system receives a first utterance from a user via a chat interface during a chat session between the user and the organization, the chat system may determine a context of the chat session. The chat system may then access, or otherwise generate, a SLM based on the context to facilitate automated interactions with the user. In some embodiments, the chat system may determine the context of the chat session based on different information associated with the chat session. For example, the chat system may analyze the words in the first utterance submitted by the user. The first utterance may include a query submitted by a user, such as "how do I dispute my last transaction." The chat system may analyze the words in the first utterance, and may determine a particular domain that is associated with the first utterance based on the words. In some embodiments, the chat system may identify keywords within the first utterance (e.g., the word "dispute") and match the keyword to a particular domain (e.g., matching the keyword "dispute" to the "dispute" domain). In some embodiments, the chat system may use a machine learning model (e.g., an LLM, etc.) to predict an intent (or a domain) associated with the first utterance based on the words in the first utterance. In some embodiments, the chat system may predict the intent based further on a history of the user, such as previous interactions with the chat system, prior purchases or returns, etc.

In some embodiments, the chat system may also generate an account context for an account of the user based on analyzing account information of the account. For example, the chat system may determine a status of the account (e.g., whether the account is active, inactive, suspended, locked, etc.). The chat system may also determine statistical data associated with transactions conducted through the account, such as a frequency of transactions, an average amount for the transactions, a transaction trend, merchants and/or categories of items purchased, etc. The chat system may determine a context for the chat session based on the domain and the account context of the user.

In some embodiments, the context determined by the chat system may also include a passive context. The passive context is not derived from the substantive content of the first utterance or the account of the user, but instead derived from the surrounding factors associated with the submission of the first utterance, such as a tone used in the first utterance, a location of the user when the first utterance was submitted, other people who may be in proximity with (e.g., within a threshold distance from) the user when the user submitted the first utterance, etc.

In some embodiments, the chat system may determine a configuration of an SLM for facilitating automated interactions with the user during the chat session based on the context. The configuration may specify a number of parameters and the types of parameters (what the parameters are configured and trained do do) to be included in the SLM. As discussed herein, the chat system may be associated with an LLM that is configured and trained to perform automated interactions with the users across all of the domains related to the organization. As such, the parameters of the LLM may include different subsets of parameters that are related to different domains of the organization, different subsets of parameters that are usable for interacting with users having different account contexts (e.g., different account statuses, different transaction histories, etc.), different subsets of parameters that are usable for interacting with users having different passive contexts, etc. In some embodiments, the chat system may select, from the parameters of the LLM, a subset of the parameters for the SLM based on the context derived for the chat session.

The chat system may then determine if one or more existing SLMs have been generated and trained for the context derived for the chat session. In some embodiments, the chat system may have generated a set of SLMs for different contexts prior to receiving the first utterance from the user. For example, the chat system may generate different SLMs for different domains related to the organization, different SLMs for different account contexts, different SLMs for different passive contexts, etc. To generate an SLM for a specific context (e.g., a particular domain, a particular account context, a particular passive context, etc.), the chat system may determine a subset of the parameters in the LLM that is associated with the specific context, which may include parameters associated with tasks that are usable across multiple different contexts, including the specific context, and parameters associated with tasks that are usable only for the specific context (e.g., parameters that are configured and trained for the particular domain, parameters that are configured and trained to interact with users having the particular account context, parameters that are configured and trained to interact with users having the particular passive context, etc.). The chat system may then access one or more portions of the computer structure of the LLM that is associated with the subset of the parameters, and generate the SLM by replicating the one or more portions of the data structure of the LLM (e.g., regenerating the portion of the data structure of the LLM for the SLM). Since each SLM includes the exact structure (including the data structures, computer logic, weights, etc.) that corresponds to one or more portions of the structure of the LLM, the SLM may inherit the "knowledge" that the LLM has acquired with respect to the particular context (e.g., the particular domain, the particular account context, the particular passive context, etc.) based on the configuration and training that the LLM has undergone.

In some embodiments, the chat system may also retrain the SLM using different training data than those used to train the LLM, and that is specific to the particular context associated with the SLM, to further improve the performance of the SLM. Such a retraining may modify one or more of the parameters incorporated into the SLM to further improve the performance of the SLM. For example, when a parameter that is used by the LLM to determine a customer's intent based on the utterance (e.g., classifying the utterance into one of the multiple domains, such as a "dispute" domain, an "account management" domain, a "rewards" domain, etc.) is incorporated into an SLM that is generated for a "dispute" domain, that parameter may be modified, through the retraining of the SLM using training data specific to the "dispute" domain, to determine a dispute reason (e.g., a billing error, a product damage, a late delivery, etc.) based on one or more utterances provided by the customer. In some embodiments, the retraining may also enable the parameter to include a predictive property. For example, in addition to training the parameter to determine a dispute reason, the parameters may be further trained to predict one or more additional domains (e.g., a "refund" domain, etc.) associated with subsequent utterances provided by the customer, a predicted resolution time, or other attributes associated with the chat session. In other words, the retraining build upon the knowledge foundation inherited from the LLM based on the parameter(s) and further customize the parameter(s) for the specific needs of the SLM. As discussed herein, the SLM may undergo additional training, for example, using the customer's subsequent utterances as feedback, until the SLM is mature (e.g., when the accuracy performance of the SLM has reached a threshold, etc.).

Since the contexts that are derived for different chat sessions may be specific to the chat sessions (based on the combinations of the domain, account contexts, passive contexts, etc.), and the number of possible contexts for the different chat sessions may be large (e.g., the different permutations of the different variables can exceed a threshold), it may be inefficient for the chat system to generate SLMs for every possible context that can be associated with a chat session. As such, the chat system may generate SLMs that are building blocks of various contexts (also referred to as "building block SLMs"). For example, the chat system may generate a set of building block SLMs that corresponds to the different domains related to the organization, where each building block SLM may correspond to one or more distinct domains related to the organization. The chat system may also generate another set of building block SLMs that corresponds to different account contexts (e.g., different account statuses, different transaction history, etc.). The chat system may also generate another set of building block SLMs that corresponds to different passive contexts.

Thus, after determining a configuration for a SLM for the chat session, the chat system may access multiple building block SLMs that are related to the configuration (e.g., SLMs that include a portion of the parameters specified in the configuration, etc.). For example, the chat system may access a first building block SLM that corresponds to the particular domain determined for the chat session. The chat system may also access a second building block SLM that corresponds to the account context (e.g., the account status, the transaction history, etc.) determined for the user. The chat system may also access a third building block SLM that corresponds to the passive context derived for the user.

The chat system may then generate the SLM for the chat session by merging the multiple existing building block SLMs (e.g., the first building block SLM, the second building block SLM, and the third building block SLM). For example, the chat system may combine the structures associated with the different parameters included in the building block SLMs to generate a merged SLM. As a result, the merged SLM includes parameters (and the corresponding structure) that are related to the particular domain determined to be related to the chat session, the account context determined for the user, and the passive context derived for the user. In other words, the merged SLM is a customized model that is generated specifically for the chat session. The chat system may deploy the merged SLM to facilitate automated interactions with the user during the chat session.

In the event that the basic block SLMs have not been generated when the chat system receives the first utterance from the user, the chat system may dynamically generate an SLM for the chat session by accessing the subset of parameters and one or more portions of the structure of the LLM that are related to the context of the chat session, using the techniques described herein. Thus, instead of merging different existing building block SLMs, the chat system may access the parameters and the corresponding portions of the structure of the LLM that are associated with the particular domain determined for the chat session, the account context associated with the chat session, and the passive context associated with the chat session. The chat system may then generate the SLM by duplicating the parameters and the portions of the structure of the LLM corresponding to the context of the chat session.

It has been contemplated that the user may engage in multiple topics with the chat system during the same chat session. For example, the user may begin the chat session by inquiring about a transaction conducted recently, then requesting to file a dispute for the transaction, and then requesting to add a funding source to the account. As such, a SLM that is generated based on the initial context (e.g., the context determined based on the initial utterance related to inquiring about a transaction) may not be sufficient in facilitating the interactions with the user throughout the entire chat session. In this regard, the chat session may apply different measures to ensure that an adequate SLM is deployed for facilitating the automated interactions with the user during the chat session, where the SLM is capable of providing relevant and intelligent content for the user during the chat session.

In some embodiments, the chat system may determine the configuration of a SLM to be deployed within a chat session based not only on the initial utterance provided by the user, but also predicted utterances that the user may provide during the same chat session. For example, after determining the context for the chat session, the chat system may enrich the context using a prediction model. The prediction model (which may be a machine learning model) may be used by the chat system to predict subsequent utterances (e.g., a second utterance, a third utterance, etc.) that the user will submit within the chat session based on the first utterance, past history or account information of the user, and/or the context. The chat system may provide the first utterance, the past history or account information, and the context to the prediction model as input values, and obtain an output that indicates one or more utterances that the user is predicted to submit to the chat system. In one example, if the user has a history of filing disputes on prior transactions, after receiving the initial utterance of inquiring about a recently conducted transaction, the prediction model may predict that the user may submit subsequent utterances related to a dispute for the recently conducted transaction. As such, the chat system may update the context to include not only the "transaction history" domain, but also the "dispute" domain for generating the SLM. The chat system may then generate the merged SLM model by combining an existing building block SLM that corresponds to the "transaction history" domain, an existing building block SLM that corresponds to the "dispute" domain, and possibly other building block SLMs based on the enriched context.

Instead of, or in addition to, using enriched contexts to generate SLMs for different chat sessions, the chat system may also continuously monitor and modify the SLM during the same chat session to ensure that the SLM is capable of facilitating automated interactions with the user. In some embodiments, after generating the SLM and deploying the SLM to facilitate automated interactions with the user during the chat session, the chat system may continue to monitor the interactions between the user and the deployed SLM. The chat system may detect whether the context of the chat session has changed based on the interactions. For example, when the user requests to add a funding source to the account during the chat session, the chat system may detect that the domain associated with the utterance is different from the one associated with the context (e.g., the "dispute" domain) determined for the chat session. Based on the detected change of context, the chat system may modify the SLM that has been deployed for the chat session. For example, the chat system may access (or otherwise generate) an SLM corresponding to the new context (e.g., the "funding source modification" domain), and may incorporate the structure of the SLM into the deployed SLM.

In another example, if the chat system determines that a domain associated with the context determined for the chat session is no longer applicable (e.g., the dispute has been processed, etc.), the chat system may modify the deployed SLM by removing parameters and/or portions of the structures of the SLM that correspond to the domain. In other words, the chat system may dynamically add and/or remove parameters and structure corresponding to the new context to the SLM, while the SLM is deployed to facilitate the automated interactions with the user during the chat session. The chat system may then use the modified SLM to continue to facilitate automated interactions with the user during the chat session.

The chat system may continue to monitor the interactions between the SLM and the user, and to modify the SLM as necessary based on the updated context of the chat session. By dynamically deploying and modifying various SLMs during the chat session, the chat system may use the SLMs to facilitate interactions with the user in an efficient manner without incurring the computation cost of generating, deploying, and utilizing an LLM.

In some embodiments, after the chat session is terminated, the chat system may use the interactions between the deployed SLM and the user during the chat session to re-train the deployed SLM and/or the underlying building block SLMs used to generate the deployed SLM. The continuous re-training of the various SLMs using actual interactions with users can further improve the performance of the SLMs, which in turn would improve the performance of the SLMs that will be generated for subsequent chat sessions.

In some embodiments, the chat system may determine whether to store the SLM that has been deployed for the chat session for future uses. For example, the chat system may assign an expiration time for the SLM. If the user initiates another chat session with the chat system before the expiration time of the SLM, the chat system can deploy that same SLM for facilitating automated interactions with the user during the new chat session. Since SLM was generated based on the context associated with the previous session, the SLM has the knowledge of the interaction history with the user, which can be useful in facilitating the interactions with the user in the new chat session.

FIG. 1 illustrates an electronic transaction system 100 within which the chat system may be implemented according to one embodiment of the disclosure. The electronic transaction system 100 includes a service provider server 130 associated with a service provider and user devices 110, 170, 180, and 190 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the service provider server 130 and/or other user devices similar to the user device 110 (e.g., the user devices 170, 180, and 190, etc.) over the network 160. For example, the user 140 may use the user device 110 to log in to a user account with the service provider to access account services or conduct electronic transactions (e.g., account transfers or payments, purchase goods and/or services, sales of goods and/or services, receive payments of the sale, access or receive content or data, etc.) with the service provider server 130. Furthermore, the user 140 represented here may be a natural person, a group of people, a community, and/or a business entity. Examples of business entities include merchant sites, resource information sites, utility sites, real estate management sites, social networking sites, etc., which offer various items for purchase and process payments for the purchases.

The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser), which may be utilized by the user 140 to conduct electronic transactions (e.g., accessing data, selling, shopping, purchasing, bidding, etc.) with the service provider server 130 over the network 160. In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110 may also include a chat client 170 for facilitating online chat sessions with another chat client (e.g., a chat client of another device, the chat system of the service provider, etc.). The chat client 170 may be a software application executed on the user device 110 for providing a chat client interface for the user 140 and for exchanging (e.g., transmitting and receiving) messages with other chat clients of a chat system. For example, during an online chat session with another entity (e.g., the chat system of the service provider), the chat client 170 may present a chat interface that enables the user 140 to input data (e.g., text data such as utterances, audio data, multi-media data, etc.) for transmitting to the other entity (via another chat client or the chat system, etc.). The chat interface may also present messages that are received from the other entity via the other chat client or the chat system. In some embodiments, the messages may be presented on the chat client interface in a chronological order according to a chat flow of the online chat session. The chat client 170 may be an embedded application that is embedded within another application, such as the UI application 112. Alternatively, the chat client 170 may be a stand-alone chat client program (e.g., a mobile app such as WhatsApp®, Facebook® Messenger, iMessages®, etc.) that is detached from any other software applications executed on the user device 110.

The user device 110, in various embodiments, may include other applications 116 as may be desired in one or more embodiments of the present disclosure to provide additional features available to the user 140. For example, the applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. The identifier 114 may include one or more attributes related to the user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the identifier 114 may be embedded within messages transmitted to other chat clients during an online chat session, and the identifier 114 may be used by the service provider server 130 to associate the user with a particular user account maintained by the service provider server 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), a request for data or content, or other types of request. The user information may include user identification information.

Each of the user devices 170, 180, and 190 may having similar hardware and software components as the user device 110. For example, each of the user devices 170, 180, and 190 may include a corresponding chat client. As such, the users of the user devices 170, 180, and 190 may be able to conduct online chat sessions with other chat clients (or the chat system) using the corresponding chat clients.

The service provider server 130, in one embodiment, may be maintained by an online service provider, which may provide services (e.g., performing electronic transactions such as electronic payment transactions, data access transactions, data processing transactions, etc.) for its users (e.g., the user 140 and users of the user devices 170, 180, and 190, etc.). As such, the service provider server 130 may include a service application 138, which may be adapted to interact with the user devices (such as the user devices 110, 170, 180, and 190, etc.) over the network 160 to facilitate the searching, selection, purchase, payment of items, and/or other services offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a log-in page, and is configured to serve the log-in page to users for logging into user accounts of the users to access various services, data, or content provided by the service provider server 130. The web server 134 may also include other webpages associated with the different services offered by the service provider server 130. As a result, a user (e.g., the user 140) may access a user account associated with the user and access various services offered by the service provider server 130, by generating HTTP requests directed at the service provider server 130.

The service provider server 130, in one embodiment, may be configured to maintain one or more user accounts (e.g., a buyer account, a seller account, etc.) in an account database 136, each of which may include account information associated with one or more users (e.g., the user 140 associated with user device 110). For example, account information may include private financial information of users and merchants, such as one or more account numbers, passwords, credit card information, banking information, digital wallets used, transaction history, or other types of financial information. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130.

The service provider server 130 may also include a chat module 132 that implements the functionality of the chat system as disclosed herein. In some embodiments, the chat module 132 may be configured to provide automated interactions with users via the chat clients of the user devices. For example, the user 140 may initiate, via the chat client 170, a chat request to the chat module 132. The chat module 132 may establish a chat session with the chat client 170 based on the request. In some embodiments, the chat module 132 may assign a session identifier for the chat session, and establish a communication channel with the chat client 170 for the chat session, such that any messages transmitted between the chat client 170 and the chat module 132 via the communication channel is incorporated into the chat session.

Upon establishing the chat session between the chat module 132 and the chat client 170, the chat module 132 may monitor chat utterances provided by the user 140. The chat module 132 may determine a context for the chat session based on analyzing the chat utterances and other information associated with the user 140. The chat module 132 may then generate a customized SLM for facilitating automated interactions with the user during the chat session.

Figure 2:
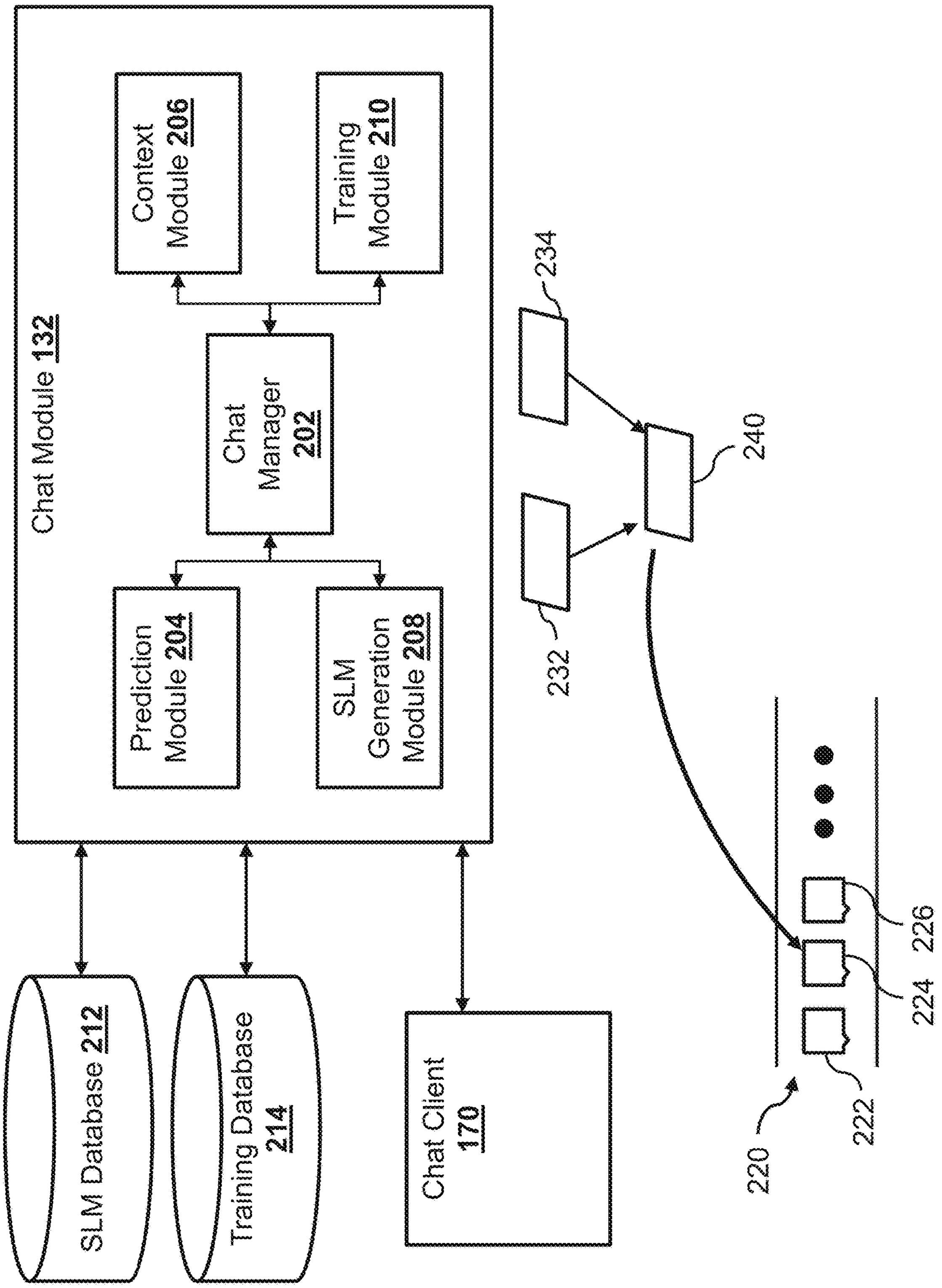
FIG. 2 is a block diagram illustrating a chat module according to an embodiment of the present disclosure.

FIG. 2 illustrates a block diagram of the chat module 132 according to an embodiment of the disclosure. The online chat module 132 includes a chat manager 202, a prediction module 204, a context module 206, a SLM generation module 208, and a training module 210. The chat manager 202 may detect that a chat client (e.g., the chat client 170) has initiated a chat request with the chat module 132, and may establish a chat session 220 between the chat module 132 and the chat client 170. After establishing the chat session 220, the chat manager 202 may begin monitoring utterances that are exchanged during the chat session 220 between the user 140 and the chat module 132. For example, the chat manager 202 may detect an utterance 222 submitted by the user 140 via the chat client 170 during the chat session 220. The utterance 222 may indicate an intent of the user 140 for the chat session 220. For example, the utterance 222 may be a request from the user 140, such as an inquiry of a past transaction (e.g., "I would like to know about the status of the payment I conducted last week"), a request for a dispute (e.g., "I want to dispute the payment I conducted two weeks ago"), a request for adding a new funding source to the account (e.g., "can I link this bank account to my user account"), or any other types of requests for services or content offered by the service provider.

In some embodiments, the chat manager 202 may use the context module 206 to determine a context for the chat session 220. The context module 206 may determine the context of the chat session 220 based on different information associated with the chat session 200. For example, the context module 206 may analyze the words in the utterance 222 submitted by the user 140. As discussed herein, the utterance 222 may indicate an intent of the user 140. As such, by analyzing the words in the utterance 222, the context module 206 may determine, from the different domains related to the service provider, a particular domain that is associated with the chat session 220. For example, the service provider associated with the service provider server 130 may be related to multiple different domains (or subject matters). Each domain may be associated with a different type of services offered by the service provider. Example domains for the service provider may include a "payment hold" domain for resolving a payment hold situation for a user, a "rewards" domain that is associated with information and services related to one or more rewards programs offered by the service provider, a "password reset" domain associated with resolving credential issues for the users, a "transaction dispute" domain associated with disputing any transactions conducted with the service provider, a "funding source modification" domain associated with modifying one or more funding sources that are linked to a user account, a "transaction inquiry" domain for inquiring information associated with any transaction conducted with the service provider, a "security" domain associated with various security issues related to the user accounts with the service provider, and other domains that are related to services offered by the service provider.

The utterance 222 may include a query submitted by the user 140, such as "can you give me the details of the transaction from last week," "how do I dispute my last transaction," "please add this credit card to my account," or other requests, which may be made through text, voice, and/or any other suitable means. The context module 206 may analyze the words in the utterance 222, and may determine a particular domain that is associated with the first utterance based on the words. In some embodiments, the chat system may identify keywords within the first utterance (e.g., the word "dispute," "credit card," "details," etc.) and match the keyword to a particular domain (e.g., matching the keyword "dispute" to the "dispute" domain, matching the keyword "credit card" to a "funding source modification" domain, matching the keyword "details" to "transaction inquiry" domain, etc.). In some embodiments, the context module 206 may use a machine learning model to predict an intent (or a domain) associated with the utterance 222 based on the words in the utterance 222.

In some embodiments, the context module 206 may also analyze account information of an account of the user 140 to determine an account context for the chat session 220. For example, the context module 206 may access account information of the account of the user 140 stored in the accounts database 136. The context module 206 may determine a status of the account (e.g., whether the account is active, inactive, suspended, locked, etc.). The context module 206 may also determine statistical data associated with transactions conducted through the account, such as a frequency of transactions, an average amount for the transactions, a transaction trend, merchants and/or categories of items purchased, etc. The chat system may determine a context for the chat session 220 based on the domain and the account context of the user 140. The context or intent may also be determined based on past interactions with the chat system and/or the entity associated with the chat system, as well as any other data available to the chat system, such as interactions or information of the user from chat boards, social networks, and the like.

In some embodiments, the context determined by the context module 206 may also include a passive context. The passive context is not derived from the substantive content of the utterance 222 or the account of the user 140, but instead derived from the surrounding factors associated with the submission of the utterance 222. For example, the context module 206 may analyze the words in the utterance 222 to determine a tone associated with the utterance 222. The context module 206 may also determine a location of the user device 110 when the utterance 222 was submitted (based on communicating with a location component, such as a GPS component, of the user device 110, etc.), and other people who may be in proximity with the user 140 (e.g., other devices associated with users of the service provider that are within a threshold distance from the user device 110, etc.) when the user 140 submitted the utterance 222, etc. The context module 206 may then incorporate the passive context into the context determined for the chat session 220.

In some embodiments, the chat manager 202 may use the prediction module 204 to enrich the context determined for the chat session 220. Since the user 140 may submit utterances related to different domains during the same chat session 220, by predicting future utterances that the user 140 would submit during the chat session 220, the chat manager 202 may incorporate the additional domains related to the future utterances that the user 140 is likely to submit in the chat session 220 into the context, and may generate a SLM that is capable of facilitating automated interactions with the user 140 throughout the chat session 220. For example, the chat manager 202 may provide the utterance, history of the user, and/or the context determined for the chat session 220 to the prediction module 204. The prediction module 204 may provide the utterance and/or the context to a machine learning model which may generate an output based on the utterance and/or the context. The prediction module 204 may determine the subject matters (or domains) associated with future utterances that the user 140 may submit during the chat session 220. The chat manager 202 may then enrich the context by incorporating the additional domains into the context determined for the chat session 220.

In some embodiments, the chat manager 202 may determine a configuration of an SLM for facilitating automated interactions with the user 140 during the chat session 220 based on the context (or the enriched context). The configuration may specify a number of parameters and the types of parameters (what the parameters are configured and trained do do) to be included in the SLM. In some embodiments, the chat module 132 may be associated with an LLM that is configured and trained to perform automated interactions with the users across all of the domains related to the service provider. As such, the parameters of the LLM may include different subsets of parameters that are related to different domains of the organization, that are usable for interacting with users having different backgrounds (e.g., different account statuses, different transaction histories, etc.), that are usable for interacting with users having different passive contexts, etc.

Figure 3:
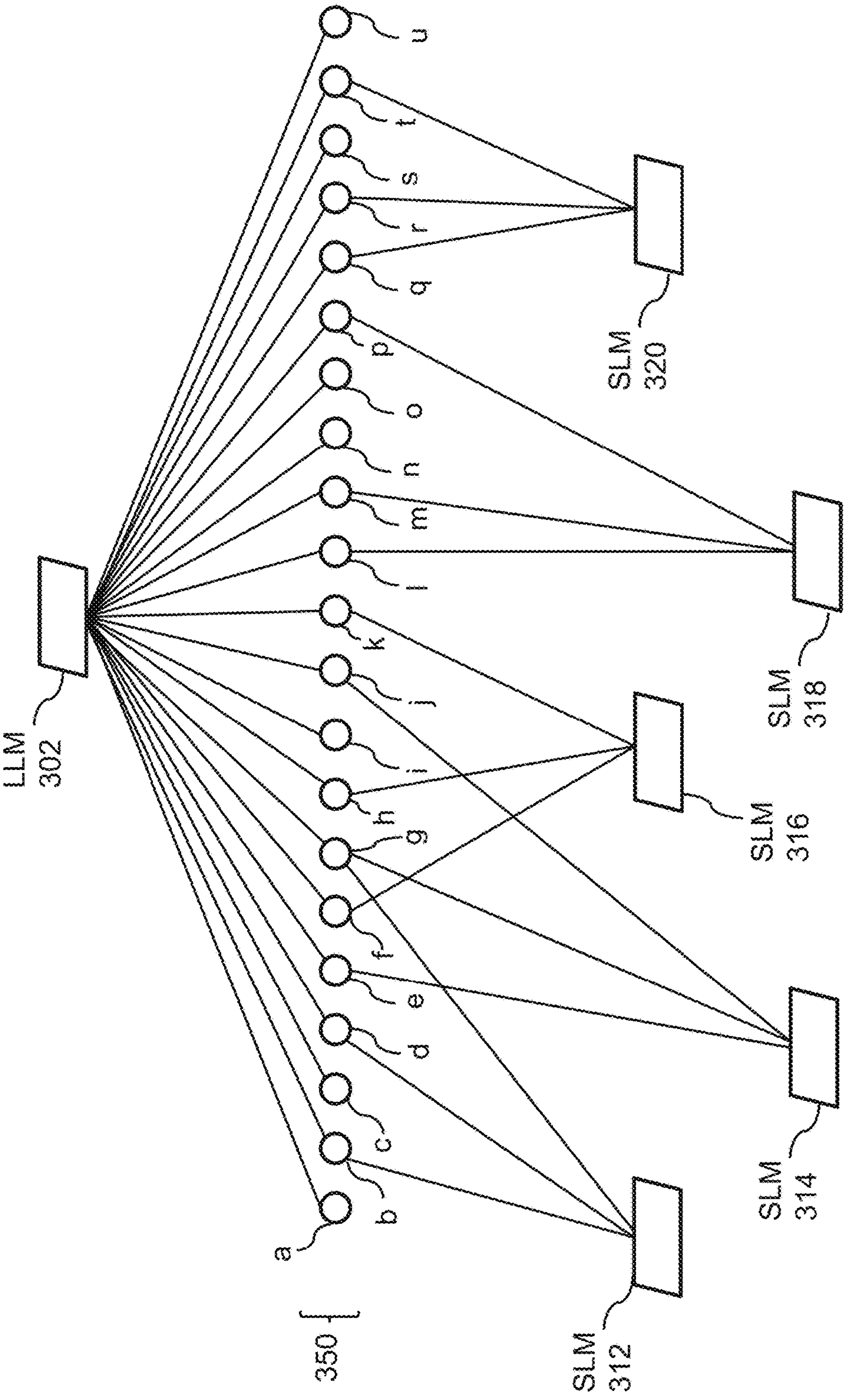
FIG. 3 illustrates various small language models generated based on a large language model according to an embodiment of the present disclosure.

FIG. 3 illustrates an LLM 302 that may be associated with the chat module 132 according to various embodiments of the disclosure. As shown in FIG. 3, the LLM 302 may include a set of parameters 350, which includes parameters a-u. Although the LLM 302 is shown to include only twenty-one parameters for illustration purposes, it has been contemplated that the LLM 302 can include a much larger number of parameters (e.g., hundreds of billions of parameters).

In some embodiments, the set of parameters 350 of the LLM 302 may include parameters that are associated with different contexts. For example, the set of parameters 350 of the LLM 302 may include different subsets of parameters that are related to different domains of the service provider, different subsets of parameters that are usable for interacting with users having different backgrounds (e.g., different account statuses, different transaction histories, etc.), different subsets of parameters that are usable for interacting with users having different passive contexts, etc. In some embodiments, the chat manager 202 may select, from the set of parameters 350 of the LLM 302, a subset of the parameters 350 for the SLM based on the context derived for the chat session 220. For example, the chat manager 350 may determine, from the parameters a-u, that the parameters a and c are associated with the domain determined for the chat session 220, that the parameters i and k are related to an account configuration similar to the account of the user 140, and the parameters r and u are related to the passive context determined for the chat session 220. Thus, the chat manager 350 may determine a configuration that includes the parameters a, c, i, k, r, and u for the SLM.

In some embodiments, the chat manager 202 may use the SLM generation module 208 to generate a SLM for the chat session 220 based on the parameters a, c, i, k, r, and u from the LLM 302. For example, the SLM generation module 208 may access one or more portions of the internal structure (e.g., nodes, connections, data objects, computer software logic, weights, etc.) of the LLM 302 associated with the parameters a, c, i, k, r, and u, and generate the structure for the SLM based on the one or more portions of the internal structure (e.g., duplicating the one or more portions of the internal structure, and incorporating the duplicated structure into the SLM, etc.).

In some embodiments, in order to improve the efficiency of generating customized SLMs specifically for different chat sessions, the chat module 132 may generate different building block SLMs for different contexts prior to receiving the utterances from the user. For example, the chat manager 202 may use the SLM generation module 208 to generate various building block SLMs, such as SLMs 312, 314, 316, 318, and 320 for different contexts. In this example, the SLM 312 is generated based on the parameters b, d, and g, and one or more portions of the internal structure of the LLM 302 associated with the parameters b, d, and g. The SLM 314 is generated based on the parameters e, g, and j, and one or more portions of the internal structure of the LLM 302 associated with the parameters e, g, and j. The SLM 316 is generated based on the parameters f, h, and k, and one or more portions of the internal structure of the LLM 302 associated with the parameters f, h, and k. The SLM 318 is generated based on the parameters l, m, and p, and one or more portions of the internal structure of the LLM 302 associated with the parameters l, m, and p. The SLM 320 is generated based on the parameters q, r, and t, and one or more portions of the internal structure of the LLM 302 associated with the parameters q, r, and t. The parameters associated with different SLMs can be completely non-overlapping or partially overlapping. Since each of the SLMs 312, 314, 316, 318, and 320 includes the corresponding portions of the structures of the LLM 302, each of the SLMs 312, 314, 316, 318, and 320 inherits the knowledge acquired and retained by the LLM 302 for the corresponding contexts.

Furthermore, some of the SLMs 312, 314, 316, 318, and 320 may be associated with different domains of the service provider, some of the SLMs 312, 314, 316, 318, and 320 may be associated with different account configurations, and some of the SLMs 312, 314, 316, 318, and 320 may be associated with different passive contexts. As such, the SLM generation module 208 may select two or more building block SLMs from the SLMs 312, 314, 316, 318, and 320, and generate the customized SLM for the chat session 220 based on the selected building block SLMs.

Referring back to FIG. 2, the SLM generation module 208 may access building block SLMs that have been pre-generated in the SLM database 212. The SLM generation module 208 may then select building block SLMs, such as SLMs 232 and 234 (which may correspond to two or more SLMs of the SLMs 312, 314, 316, 318, and 320 in FIG. 3) for the chat session 220 based on the context determined for the chat session 220. For example, the SLM 232 may be associated with a domain determined for the chat session 220, and the SLM 234 may be associated with the account context of the user 140. The SLM generation module 208 may then merge the SLMs 232 and 234 to generate the SLM 240. For example, the SLM generation module 208 may combine the parameters and the structures of the SLMs 232 and 234 to generate the SLM 240. Since the SLM 240 includes the parameters and the structures of the SLMs 232 and 234, the SLM 240 inherits the knowledge acquired by the SLMs 232 and 234. In some embodiments, the chat manager 202 may also select training data, from the training database 214, that is relevant to the context determined for the chat session 220, and train the SLM 240 using the selected training data.

The chat manager 202 may then deploy the SLM 240 for facilitating automated interactions with the user 140 during the chat session 220. For example, the chat manager 202 may provide the utterance 222 and/or the context as input to the SLM 240. Based on the utterance 222, the context, and the knowledge acquired indirectly from the LLM 302, the SLM 240 may generate a response 224, which may be transmitted to the user client 170 via the communication channel during the chat session 220. In some embodiments, the SLM 240 may be configured to provide a series of interactions (e.g., multiple responses to the user's utterances) during the chat session 220. For example, when the user 140 inquires about a transaction conducted in the past week, the SLM 240 may prompt the user 140 for an identification of a specific transaction, and may provide any detail information about the transaction. When the user 140 requests to file a dispute for a transaction, the SLM 240 may prompt the user 140 for additional information, such as a reason for the dispute, an amount to be disputed, etc.

In some embodiments, the chat manager 202 may also continuously monitor and modify the SLM 240 during the chat session 220 to ensure that the SLM is adequate in facilitating automated interactions with the user 140 during the chat session 220. In some embodiments, after generating the SLM 240 and deploying the SLM 240 to facilitate automated interactions with the user 140 during the chat session 220, the chat manager 202 may continue to monitor the interactions between the user 140 and the deployed SLM 240. The chat manager 202 may detect whether the context of the chat session 220 has changed based on the interactions. For example, when the user submits another utterance 226 during the chat session 220, the chat manager 202 may determine an updated context based on the utterance 226. In some embodiments, the chat manager 202 may determine the updated context based on the new utterance 226, the original context determined for the chat session 220 and all of the prior utterances included in the chat session 220. For example, if the user 140, after requesting the dispute for a transaction, asks to add a credit card to the account, the chat manager 202 may determine that a new domain (e.g., the "funding source modification" domain) is now associated with the chat session 220. In another example, if it is determined that the task requested by the user 140 (e.g., filing a dispute on a transaction, etc.) has been completed, the chat manager 202 may determine that the domain (e.g., the "dispute" domain) may no longer be applicable to the chat session 220.

Based on the detected change of context, the chat manager 202 may use the SLM generation module 208 to modify the SLM 240 that has been deployed for the chat session. For example, the chat system may access (or otherwise generate) an SLM (e.g., one of the SLMs 312, 314, 316, 318, and 320) corresponding to the new context (e.g., the "funding source modification" domain), and may incorporate the structure of the SLM into the deployed SLM 240. In other words, the chat module 132 may dynamically add (and/or remove) parameters and structure corresponding to the new context to the SLM 240, while the SLM 240 is deployed to facilitate the automated interactions with the user 140 during the chat session 220. The chat manager 202 may then use the modified SLM 240 to continue to facilitate automated interactions with the user 140 during the chat session 220.

The chat manager 202 may continue to monitor the interactions between the SLM 240 and the user 140 during the chat session 220, and to modify the SLM 240 as necessary based on any updated context determined for the chat session 220. By dynamically deploying and modifying various SLMs during different chat sessions conducted with various users, the chat module 132 may use the SLMs to facilitate interactions with users in an efficient manner without incurring the computation cost of generating, deploying, and utilizing an LLM.

In some embodiments, after the chat session 220 is terminated, the training module 210 may use the interactions between the deployed SLM 240 and the user 140 during the chat session 220 (e.g., the utterances 222, 224, 226, etc.) to re-train the underlying building block SLMs (e.g., the SLMs 232 and 234). For example, if responses generated resulted in more questions or requests that indicate the response was not accurate, the underlying building block SLMs may be re-trained such that future similar utterances by the user or a similar situated user will result in a different response that is more accurate. The training module 210 may also store the interactions in the training database 214 for training SLMs that are generated for future chat sessions. The continuous re-training of the underlying building block SLMs using actual interactions with users can further improve the performance of the building block SLMs, which in turn would improve the performance of the merged SLMs generated based on the underlying building block SLMs for different chat sessions. In some embodiments, the chat manager 202 may determine whether to store the SLM 240 that has been deployed for the chat session 220 for future uses. For example, the chat manager 202 may assign an expiration time for the SLM 240. If the user 140 initiates another chat session with the chat module 132 before the expiration time of the SLM 240, the chat manager 202 can deploy that same SLM 240 for facilitating automated interactions with the user 140 during the new chat session. Since SLM 240 was generated based on the context associated with the previous session 220, the SLM 240 has the knowledge of the interaction history with the user 140, which can be useful in facilitating the interactions with the user 140 in the new chat session.

Figure 4:
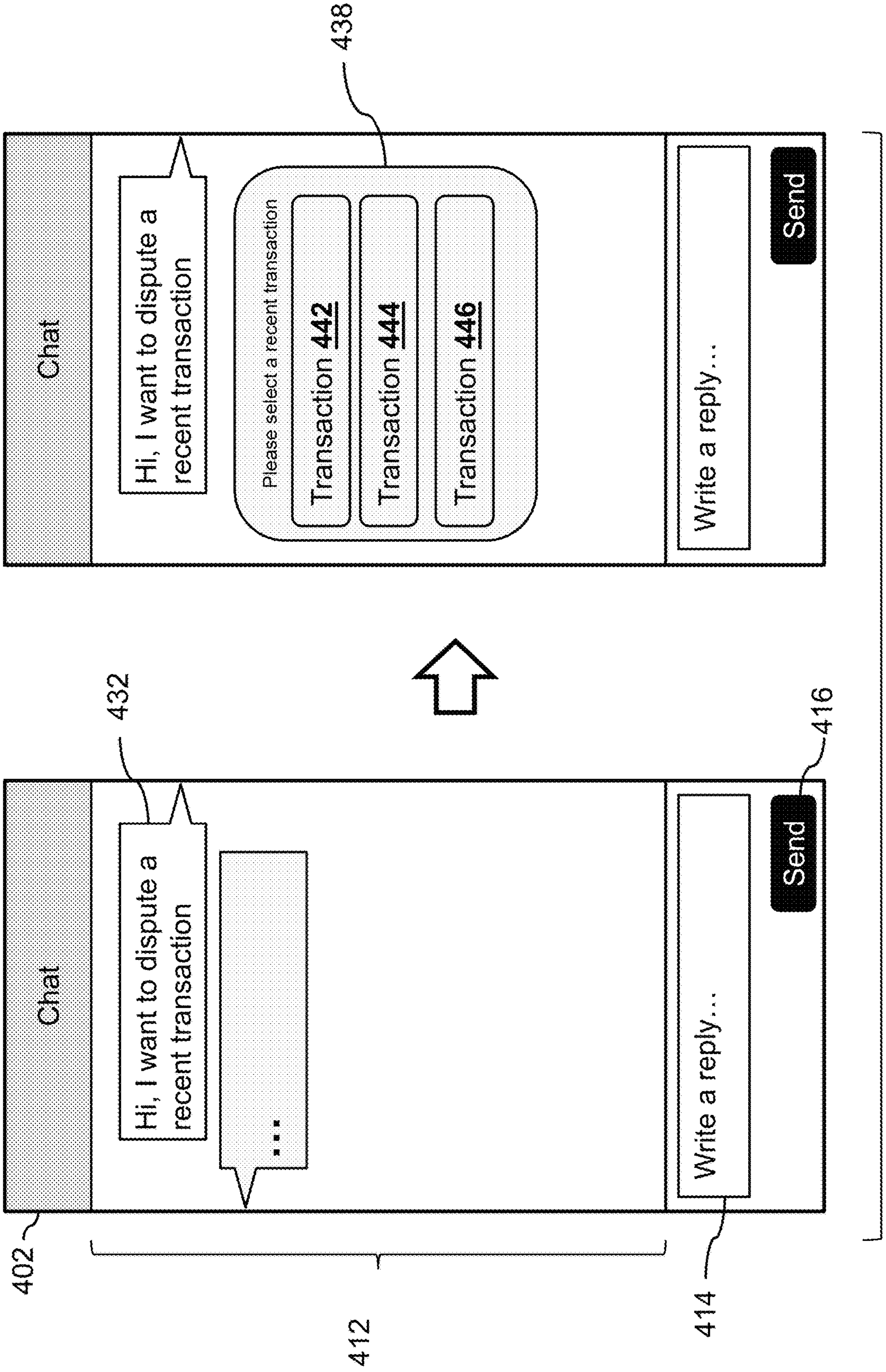
FIG. 4 illustrates an exemplary dialogue in an online chat session according to an embodiment of the present disclosure.

FIG. 4 illustrates an example chat interface 402 provided by the chat client 170. As shown in FIG. 4, the chat interface 402 includes a chat presentation portion 412 for displaying messages and/or content during a chat session (e.g., the chat session 220). The chat session 220 may include messages exchanged between the chat client 170 and the chat module 132. The chat interface 402 also includes an input portion 414 that enables the user 140 to input a message (e.g., an utterance that may include text data, audio data, multi-media data, etc.) for transmitting to the chat module 132 and a 'send' button 416 for submitting a message typed in the input portion 414.

In this example, the user 140 may transmit a message 432 (e.g., an utterance) "Hi, I want to dispute a recent transaction" by typing the message 432 in the input portion 414 and selecting the 'send' button 416. The user 140 may also speak the message, which may or may not then be converted to text. When the user 140 selects the 'send' button 416, the message 432 is transmitted by the chat client 170 to the chat module 132. As the chat manager 202 monitors activities within the chat session 220, the chat manager 202 may obtain the message 432 that was transmitted by the chat client 170.

The chat manager 202 may analyze the utterance 432 along with other information, such as the account configuration of an account of the user 140 to generate a context for the chat session 220. The SLM generation module 208 may then generate a SLM (e.g., the SLM 240) for the chat session 220 based on the context. The SLM may provide automated interactions with the user 140 during the chat session 220. For example, the SLM 240 generates the response 438 and provides the response to the user 140 via the chat client 170 during the chat session 220. In this example, the response 438 includes several transactions 442, 444, and 446 conducted by the user 140 recently, and enables the user 140 to select one of the transactions for the dispute. The response 438 may include or alternatively be presented via audio. The format of the response may depend on the response, the user, the device, and other factors.

Figure 5:
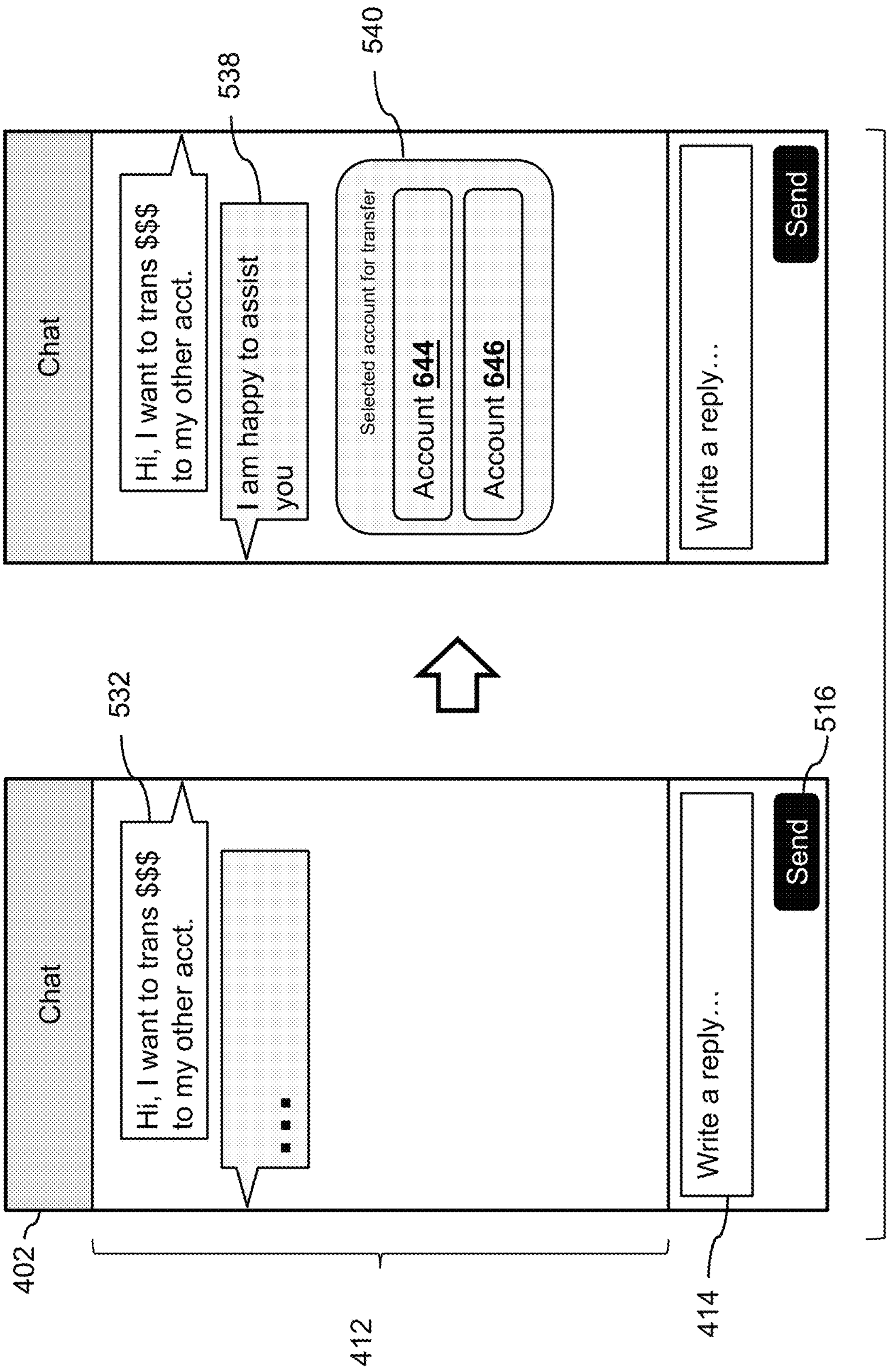
FIG. 5 illustrates another exemplary dialogue in an online chat session according to an embodiment of the present disclosure.

FIG. 5 illustrates another example utterance 532 provided by the user 104 during the chat session 220. As shown in FIG. 5, the utterance 532 "Hi, I want to trans $$$ to my other acct." In some embodiments, the chat manager 202 may update the context determined for the chat session 220 based on new utterances submitted by the user 140 during the chat session 220. In this example, after requesting to file a dispute for a transaction, the user 140 asks to transfer funds to an account. In this example, the chat manager 202 may determine that a new domain (e.g., the "fund transfer" domain) may now be associated with the chat session 220 based on the utterance 532. The chat manager 202 may use the SLM generation module 208 to modify the SLM 240 based on the new context. For example, the SLM generation module 208 may add additional parameters and structure associated with the "fund transfer" domain into the SLM 240. The chat manager 202 may then use the modified SLM 240 to facilitate interactions with the user 140 during the chat session 220. Based on the new structure and parameters added to the SLM 240, the SLM 240 is now capable of generating relevant responses for the user 140 in the "fund transfer" domain. In this example, the modified SLM 240 generates the responses 538 and 540 for the chat session 220 based on the utterance 532. Specifically, the responses 538 and 540 prompts the user 140 for the account to which the funds are to be transferred.

Figure 6:
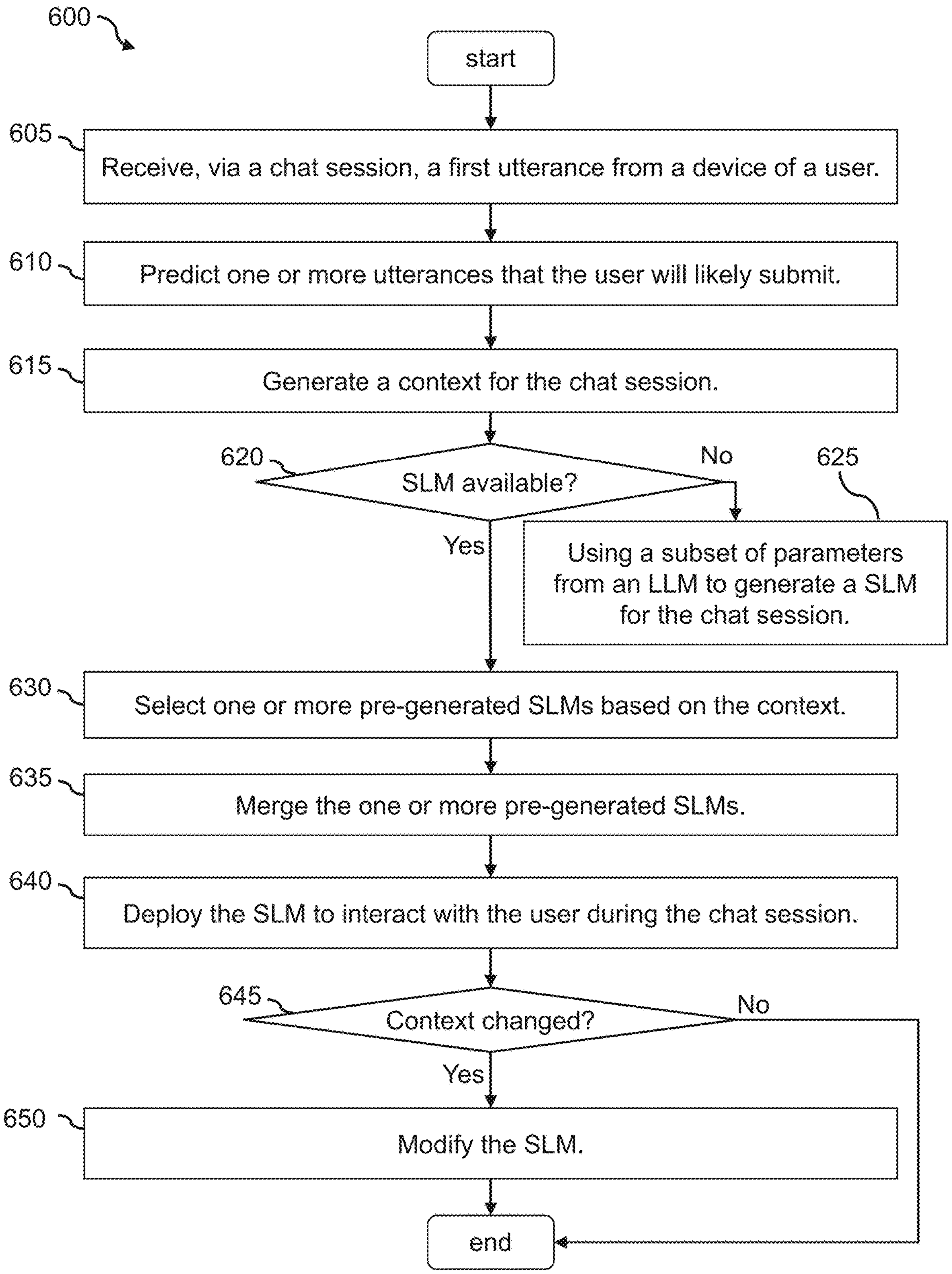
FIG. 6 is a flowchart showing a process of dynamically generating and modifying a small language model for a chat session according to an embodiment of the present disclosure.

FIG. 6 illustrates a process 600 for facilitating automated interactions with users according to various embodiments of the disclosure. At least some of the steps in the process 600 may be performed by the chat module 132. The process 600 begins by receiving (at step 605), via a chat session, a first utterance from a device of a user. For example, after establishing a chat session 220 with the chat client 170 of the user device 110, the chat manager 202 may monitor any utterances provided by the user 140 during the chat session 220. In one example, the chat manager may detect the utterance 220 submitted by the user 140 during the chat session 220.

The process 600 then predicts (at step 610) one or more utterances that the user will submit and generates (at step 615) a context for the chat session. For example, the chat manager 202 may use the context module 206 to generate a context for the chat session 220 based on the utterance 222 and other information associated with the chat session 220 and/or the user 140. In some embodiments, the context module 206 may analyze the words in the utterance and determine a domain related to the service provider based on the words. In some embodiments, the context module 206 may also access additional information, such as account information associated with the user 140 (e.g., an account status, a transaction history, etc.), environmental information associated with the user 140 at the time that the utterance 222 was submitted (e.g., a tone of the utterance 222, a location of the user 140, one or more other users within a threshold distance from the user 140, etc.). The context module 206 may generate a context based on the domain associated with the utterance 222 and the additional information.

Since the user 140 may submit utterances that are related to different domains of the service provider during the same chat session 220, the context module 206 of some embodiments may use the prediction module 204 to predict one or more additional utterances that the user 140 will submit during the chat session 220. In some embodiments, the context module 206 and/or the chat manager 202 may provide the utterance 222 and the additional information (e.g., the context) to the prediction module 204 for predicting utterances that the user 140 may submit during the chat session 220. In some embodiments, the prediction module 204 may use the utterance 222 and additional information to predict the additional utterances that the user 140 may submit during the chat session 220. In some embodiments, the prediction module 204 may provide the utterance 222 and the additional information to a machine learning model that is configured to predict future utterances of a user. The prediction module 204 may obtain an output from the machine learning model. Based on the output, the prediction module 204 may determine one or more additional domains that may be related to the chat session 220. In some embodiments, the context module 206 may incorporate the additional domains determined by the prediction module 204 into the context determined for the chat session 220.

The chat manager 202 may then use the SLM generation module 208 to generate a SLM for facilitating automated interactions with the user 140 during the chat session 220 based on the context. By incorporating the additional domains into the context, the chat manager may generate a SLM that is more likely to be capable of facilitating automated interactions with the user 140 throughout the entire chat session 220.

The process 600 then determines (at step 620) if one or more SLMs related to the context are available. If no SLMs related to the context are available, the process 600 uses (at step 625) a subset of parameters from an LLM to generate a SLM for the chat session. On the other hand, if one or more SLMs related to the context are available, the process 600 selects (at step 630) the one or more pre-generated SLMs based on the context and merges (at step 635) the one or more pre-generated SLMs. As discussed herein, the chat manager 202 may use the SLM generation module 208 to generate a SLM specifically for the chat session 220 based on the context determined for the chat session 220. In some embodiments, in order to generate the SLM for the chat session 220, the SLM generation module 208 may determine a configuration for the SLM. The configuration may include a number of parameters and the types of parameters to be included in the SLM. The types of parameters may correspond to a subset of parameters of an existing LLM (e.g., the LLM 302) that is associated with the chat module 132. The SLM generation module 208 may then access the selected parameters and the portion(s) of the internal structure of the LLM 302 that is associated with the selected parameters, and duplicate them for the SLM. As a result, the SLM may inherit the knowledge that has been acquired by the LLM in relation to the context determined for the chat session 220.

In some embodiments, in order to enhance the performance of generating SLMs for different chat sessions, the SLM generation module 208 may pre-generate SLMs for different contexts. However, since the number of different possible contexts (e.g., the different combinations of domains, different account contexts, different passive contexts, etc.) may be very large, the SLM generation module 208 may generate building block SLMs that are associated with different specific sub-contexts. For example, the SLM generation module 208 may generate a set of building block SLMs for the different domains related to the service provider, a set of building block SLMs for different account contexts, and a set of building block SLMs for different passive contexts. Each of the building block SLMs may be generated using different subset of parameters of the LLM 302 and the corresponding portions of the internal structure of the LLM 302.

To generate the SLM for the chat session 220, the SLM generation module 208 may select different building block SLMs that are related to the context determined for the chat session 220. For example, the SLM generation module 208 may select a first set of building block SLMs that is associated with the domain(s) determined to be relevant to the chat session 220. The SLM generation module 208 may also select a second set of building block SLMs that is associated with the account context determined for the chat session 220, and a third set of building block SLMs that is associated with the passive context determined for the chat session 220. The SLM generation module 208 may then merge the selected building block SLMs (e.g., the SLMs 232, 234, etc.). For example, the SLM generation module 208 may combine the parameters and the corresponding structures of the building block SLMs into a single SLM 240. The single SLM 240 becomes a customized SLM generated specifically for the chat session 220.

The process 600 deploys (at step 640) the SLM to interact with the user during the chat session. For example, the chat manager 202 may deploy the generated SLM 240 to facilitate automated interactions with the user 140 during the chat session 220. The SLM may analyze utterances (e.g., the utterance 222) submitted by the user 140 during the chat session 220, and may generate content (e.g., a response 224) based on the utterance 222. The chat manager 220 may provide the response 224 to the user 140 during the chat session 220.

The process 600 then determines (at step 645) if the context of the chat session has changed. If it is determined that the context has changed, the process 600 modifies (at step 650) the SLM. For example, the chat manager 202 may continue to monitor the utterances exchanged between the user 140 and the chat module 132 during the chat session 220. The chat manager 202 may also use the context module 206 to analyze the utterances being exchanged during the chat session 220. If it is detected that the context of the chat session 220 has changed due to a new utterance (e.g., the utterance 226 submitted by the user 140), the chat manager 202 may use the SLM generation module 208 to modify the SLM 240 based on the updated context determined by the context module 206. For example, when the updated context determines an additional domain related to the service provider, the SLM generation module 208 may incorporate additional parameters and structure (e.g., from one or more existing building block SLMs, etc.) into the SLM 240. The chat manager 202 may then deploy the modified SLM 240 to facilitate automated interactions with the user 140 during the chat session 220.

Figure 7:
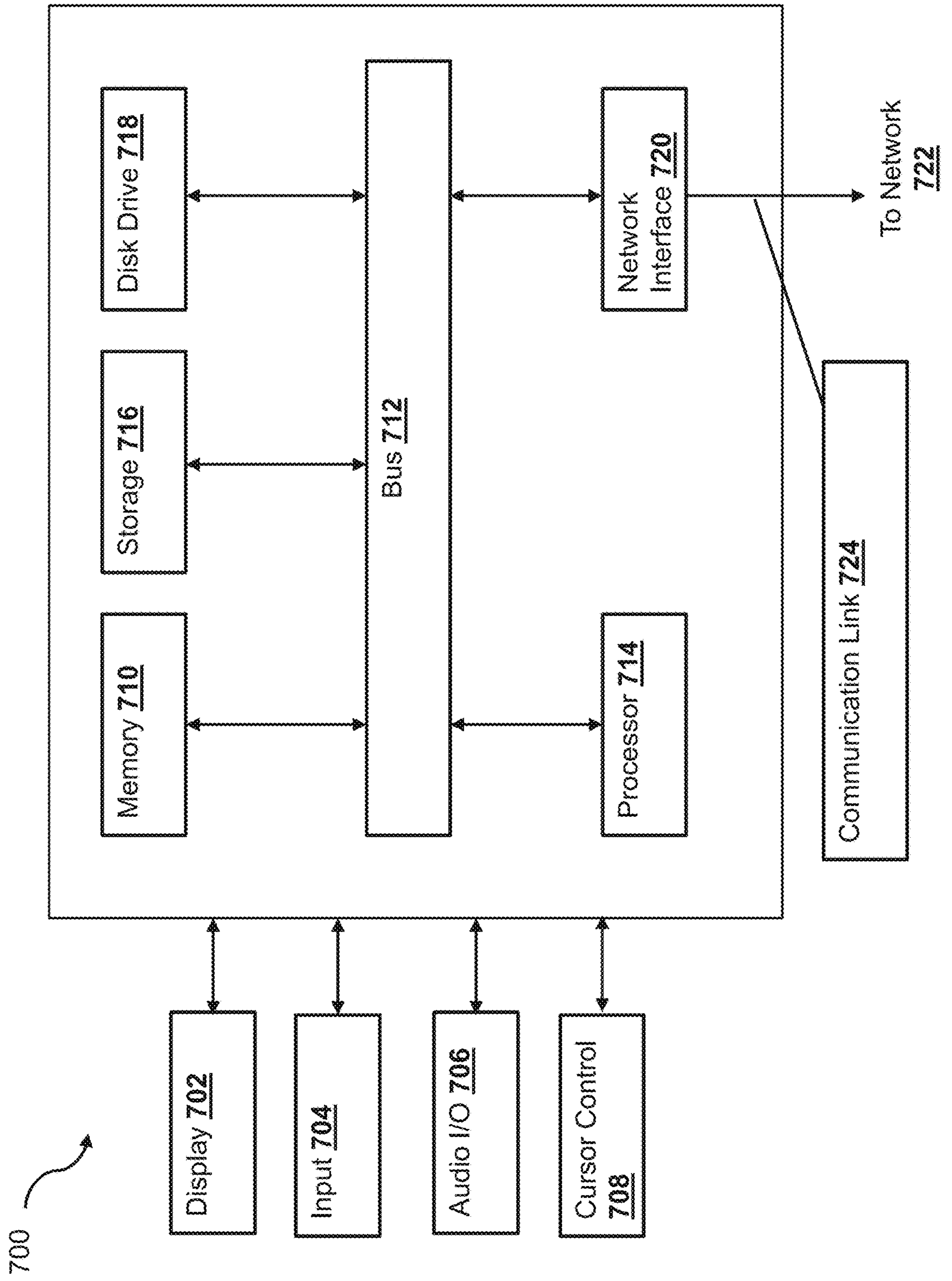
FIG. 7 is a block diagram of a system for implementing a device according to an embodiment of the present disclosure.

FIG. 7 is a block diagram of a computer system 700 suitable for implementing one or more embodiments of the present disclosure, including the service provider server 130, and the user devices 110, 170, 180, and 190. In various implementations, each of the user devices 110, 170, 180, and 190 may include a mobile cellular phone, personal computer (PC), laptop, wearable computing device, etc. adapted for wireless communication, and the service provider server 130 may include a network computing device, such as a server. Thus, it should be appreciated that the devices 110, 170, 180, 190, and 130 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account, a checkout page for purchasing an item from a merchant, or a chat interface for facilitating an online chat session. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid state drive, a hard drive). The computer system 700 performs specific operations by the processor 714 and other components by executing one or more sequences of instructions contained in the system memory component 710. For example, the processor 714 can perform the automated online chatting functionalities described herein according to the process 600.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:

a non-transitory memory; and one or more hardware processors coupled with the non-transitory memory and configured to read instructions from the non-transitory memory to cause the system to perform operations comprising:

receiving a first utterance from a device associated with a user during a chat session between the system and the device, wherein the first utterance comprises a plurality of words;

deriving a context for the chat session based on analyzing the plurality of words in the first utterance, wherein the context indicates a particular knowledge domain from a plurality of knowledge domains related to a service provider;

selecting, from a plurality of small language models corresponding to different contexts, two or more small language models based on the context derived for the chat session, wherein the plurality of small language models was generated for the different contexts using parameters associated with a large language model, wherein different subsets of the parameters were selected for the different contexts, and wherein the plurality of small language models was implemented using the different subsets of the parameters selected for the different contexts;

generating a model for the chat session based on merging the two or more small language models; and causing the model to generate a response to the first utterance.

2. The system of claim 1, wherein the operations further comprise:

predicting, based on the first utterance, one or more utterances that the user will submit within the chat session; and enriching the context based on the predicted one or more utterances, wherein the two or more small language models are selected further based on the enriched context.

3. The system of claim 1, wherein the context comprises an account context, and wherein the deriving the context for the chat session comprises:

accessing account information associated with an account of the user, wherein the account information comprises an account status and a transaction history; and deriving the account context based on the account information.

4. The system of claim 1, wherein the plurality of small language models was generated using an internal structure associated with the large language model.

5. The system of claim 1, wherein the operations further comprise:

subsequent to causing the model to generate the response to the first utterance, receiving a second utterance from the device during the chat session;

deriving an updated context for the chat session based on the second utterance;

modifying the model based on the updated context; and causing the modified model to generate a second response to the second utterance.

6. The system of claim 5, wherein the modifying the model comprises at least one of adding one or more additional parameters to the model or removing one or more parameters from the model.

7. A method comprising:

receiving, from a chat client during a chat session established between the chat client and a computer system, a first utterance from the chat client;

deriving, by the computer system, a context for the chat session based on the first utterance;

selecting, from a plurality of small language models corresponding to different contexts, two or more small language models based on the context derived for the chat session;

generating, by the computer system, a small language model for the chat session based on merging the two or more small language models, wherein the generating the small language model comprises adding a first internal structure of a first small language model of the two or more small language models to a second internal structure of a second small language model of the two or more small language models;

generating, using the small language model, a response to the first utterance; and transmitting the response to the chat client.

8. The method of claim 7, further comprising:

receiving a second utterance from the chat client during the chat session; and training the small language model using the second utterance.

9. The method of claim 7, wherein the generating the small language model for the chat session further comprises:

determining that the first small language model comprises a first set of parameters; and adding the first set of parameters to the second small language model.

10. The method of claim 9, further comprising training at least one of the first small language model or the second small language model.

11. The method of claim 7, further comprising:

analyzing words included in the first utterance; and determining, from a plurality of domains related to a service provider, a particular domain associated with the chat session based on the analyzing the words, wherein the deriving the context is further based on the particular domain.

12. The method of claim 7, further comprising:

accessing information associated with an account corresponding to the chat client; and determining an account context based on analyzing the information, wherein the account context indicates at least one of an account status of the account or a transaction history of the account, and wherein the deriving the context is further based on the account context.

13. A non-transitory machine-readable medium having stored thereon machine-readable instructions executable to cause a machine to perform operations comprising:

receiving a first utterance from a device associated with a user within a chat session established with the device;

deriving a context for the chat session based on analyzing words included in the first utterance, wherein the context indicates a particular domain from a plurality of domains related to a service provider;

determining a configuration for a small language model based on the context, wherein the configuration indicates a subset of parameters associated with a large language model configured to facilitate automated chat session interactions with users of the service provider;

generating the small language model using one or more portions of a structure of the large language model corresponding to the subset of the parameters; and causing the small language model to generate a response to the first utterance.

14. The non-transitory machine-readable medium of claim 13, wherein the operations further comprise transmitting the response to the device within the chat session.

15. The non-transitory machine-readable medium of claim 13, wherein the operations further comprise:

predicting, based on the first utterance, one or more utterances that the user will submit within the chat session; and enriching the context based on the predicted one or more utterances, wherein the determining the configuration for the small language model is further based on the enriched context.

16. The non-transitory machine-readable medium of claim 13, wherein the context comprises an account context, and wherein the deriving the context for the chat session comprises:

accessing account information associated with an account of the user, wherein the account information comprises an account status and a transaction history; and deriving the account context based on the account information.

17. The non-transitory machine-readable medium of claim 13, wherein the operations further comprise:

receiving a second utterance from the device within the chat session;

deriving an updated context for the chat session based on the second utterance;

modifying the small language model based on the updated context; and causing the modified small language model to generate a second response to the second utterance.

18. The non-transitory machine-readable medium of claim 17, wherein the modifying the small language model comprises at least one of adding one or more additional parameters to the small language model or removing one or more parameters from the small language model.

19. The system of claim 1, wherein the generating the model comprises adding a first internal structure of a first small language model of the two or more small language models to a second internal structure of a second small language model of the two or more small language models.

20. The method of claim 7, wherein different subsets of parameters associated with a large language model are selected for the different contexts, and wherein the plurality of small language models is implemented using the different subsets of parameters selected for the different contexts.

* * * * *